United States Patent [19]
Hirabayashi

[11] Patent Number: 6,049,629
[45] Date of Patent: *Apr. 11, 2000

[54] CODING APPARATUS FOR CODING IMAGE DATA USING ONE OF AN INTERPICTURE CODING METHOD AND AN INTERPICTURE MOTION-COMPENSATED CODING METHOD

[75] Inventor: Yasuji Hirabayashi, Kawasaki, Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/711,005

[22] Filed: Sep. 11, 1996

Related U.S. Application Data

[62] Division of application No. 08/034,701, Mar. 19, 1993, Pat. No. 5,592,302.

[30] Foreign Application Priority Data

Mar. 23, 1992  [JP]  Japan ................................ 4-064555

[51] Int. Cl.[7] .................................................. H04N 7/137
[52] U.S. Cl. ........................................... 382/239; 382/232
[58] Field of Search ..................................... 358/432–433, 358/426–427, 261.1–261.4, 404, 444; 382/239, 232, 236, 238; 348/420–421

[56] References Cited

U.S. PATENT DOCUMENTS

| | | | |
|---|---|---|---|
| 4,743,967 | 5/1988 | Takenaka et al. | 358/136 |
| 4,942,465 | 7/1990 | Ohta | 358/133 |
| 5,040,061 | 8/1991 | Yonemitsu | 358/136 |
| 5,070,532 | 12/1991 | Faul et al. | 358/433 |
| 5,101,280 | 3/1992 | Moronaga et al. | 358/433 |
| 5,103,307 | 4/1992 | Sugiyama | 358/136 |
| 5,107,345 | 4/1992 | Lee | 358/433 |
| 5,109,437 | 4/1992 | Honda | 358/433 |
| 5,150,208 | 9/1992 | Otaka et al. | 348/420 |
| 5,267,037 | 11/1993 | Sugiyama | 358/136 |
| 5,283,656 | 2/1994 | Sugahara | 358/433 |
| 5,374,958 | 12/1994 | Yanagihara | 348/421 |

FOREIGN PATENT DOCUMENTS

| | | |
|---|---|---|
| 0267581 | 5/1988 | European Pat. Off. . |
| 0512854 | 11/1992 | European Pat. Off. . |
| 0530022 | 3/1993 | European Pat. Off. . |
| 0538013 | 4/1993 | European Pat. Off. . |

OTHER PUBLICATIONS

Achhammer, et al., "Videophone and Audiovisual Workstation with px64 kbit/s for new applications," *PTR Philips Telecommunication Review*, vol. 49, No. 3 (Sep. 1991), pp. 52–57.

Hölzlwimmer, et al., "A New Hybrid Coding Technique for Videoconference Applications at 2 Mbit/s," *Proceedings of Second International Technical Symposium on Optical and Electrooptical Applied Science and Engineering*, SPIE, vol. 594, Image Coding (1985), pp. 250–259.

"Draft Revision of Recommendation H.261: Video Codec for Audiovisual Services at px64 kbit/s," *Signal Processing: Image Communication*, vol. 2 (1990), pp. 221–239.

*Primary Examiner*—Thomas D Lee
*Assistant Examiner*—Stephen Brinich
*Attorney, Agent, or Firm*—Fitzpatrick, Cella, Harper & Scinto

[57] ABSTRACT

An amount of data coded in the past is detected at a prescribed period. Criteria for deciding whether a pixel block of interest is to be coded by processing for motion-compensated coding of interframe difference, processing for coding of interframe difference without motion compensation or processing for intraframe coding are adjusted based upon the amount of code detected.

20 Claims, 20 Drawing Sheets

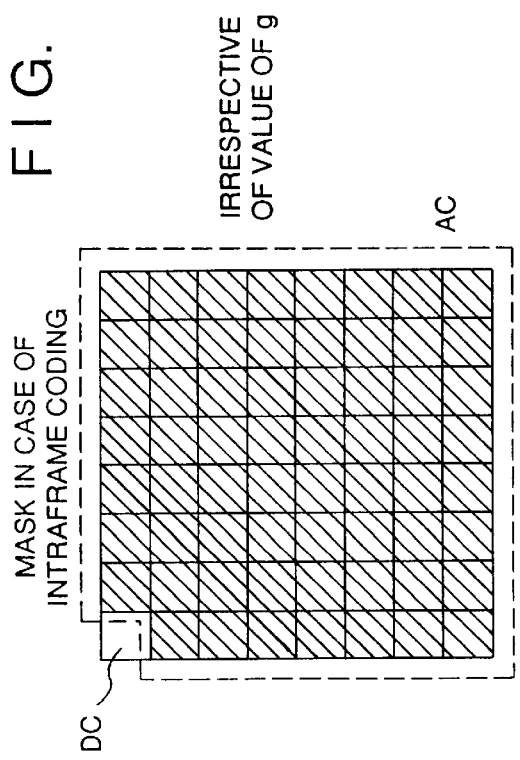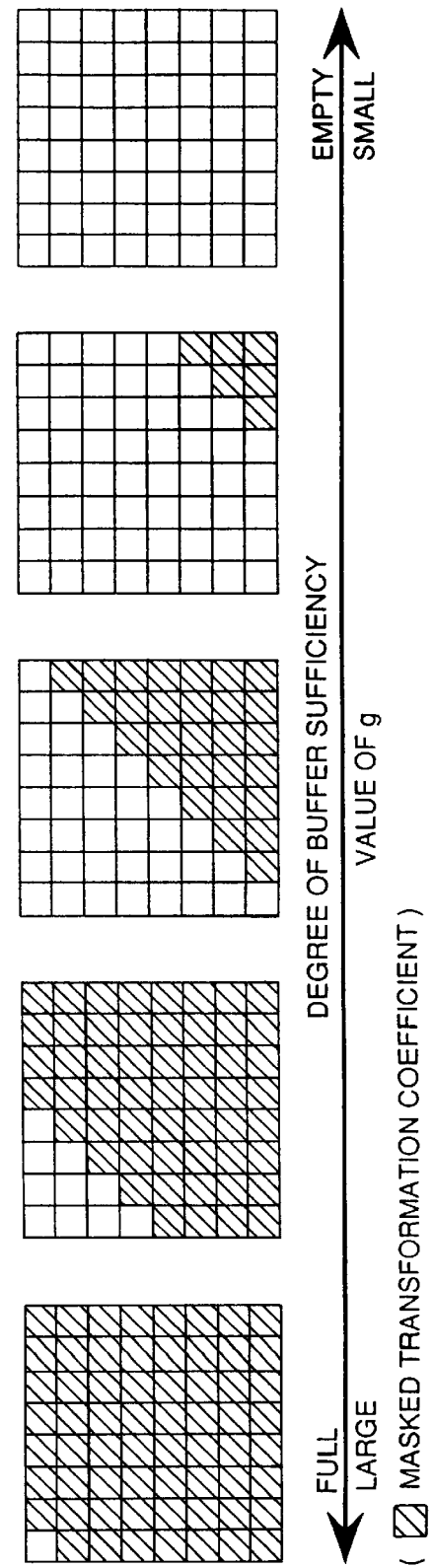

FIG. 9A

| ID | g | NUMBER OF BLOCKS TO BE CODED | SPECTRUM | EOB | SPECTRUM | EOB | SPECTRUM | EOB | SPECTRUM | EOB |

FIG. 9B

| ID | g | VECTOR | NUMBER OF BLOCKS TO BE CODED | SPECTRUM | EOB | SPECTRUM | EOB | SPECTRUM | EOB | SPECTRUM | EOB |

FIG. 9C

| ID | g | DC COMPONENT | AC COMPONENT | EOB | DC COMPONENT | AC COMPONENT | EOB | DC COMPONENT | AC COMPONENT | EOB |
|---|---|---|---|---|---|---|---|---|---|---|
|   |   | DC COMPONENT | AC COMPONENT | EOB | DC COMPONENT | AC COMPONENT | EOB | DC COMPONENT | AC COMPONENT | EOB |

FIG. 10A

| ID | g | NUMBER OF BLOCKS TO BE CODED | DC | EOB | DC | EOB | DC | EOB |
|---|---|---|---|---|---|---|---|---|
| | | | DC | EOB | DC | EOB | DC | EOB |

FIG. 10B

| ID | g | NUMBER OF BLOCKS TO BE CODED | VECTOR | DC | EOB | DC | EOB | DC | EOB |
|---|---|---|---|---|---|---|---|---|---|
| | | | | DC | EOB | DC | EOB | DC | EOB |

FIG. 10C

| ID | g | DC COMPONENT | EOB | DC COMPONENT | EOB | DC COMPONENT | EOB | DC COMPONENT | EOB | DC COMPONENT | EOB | DC COMPONENT | EOB |

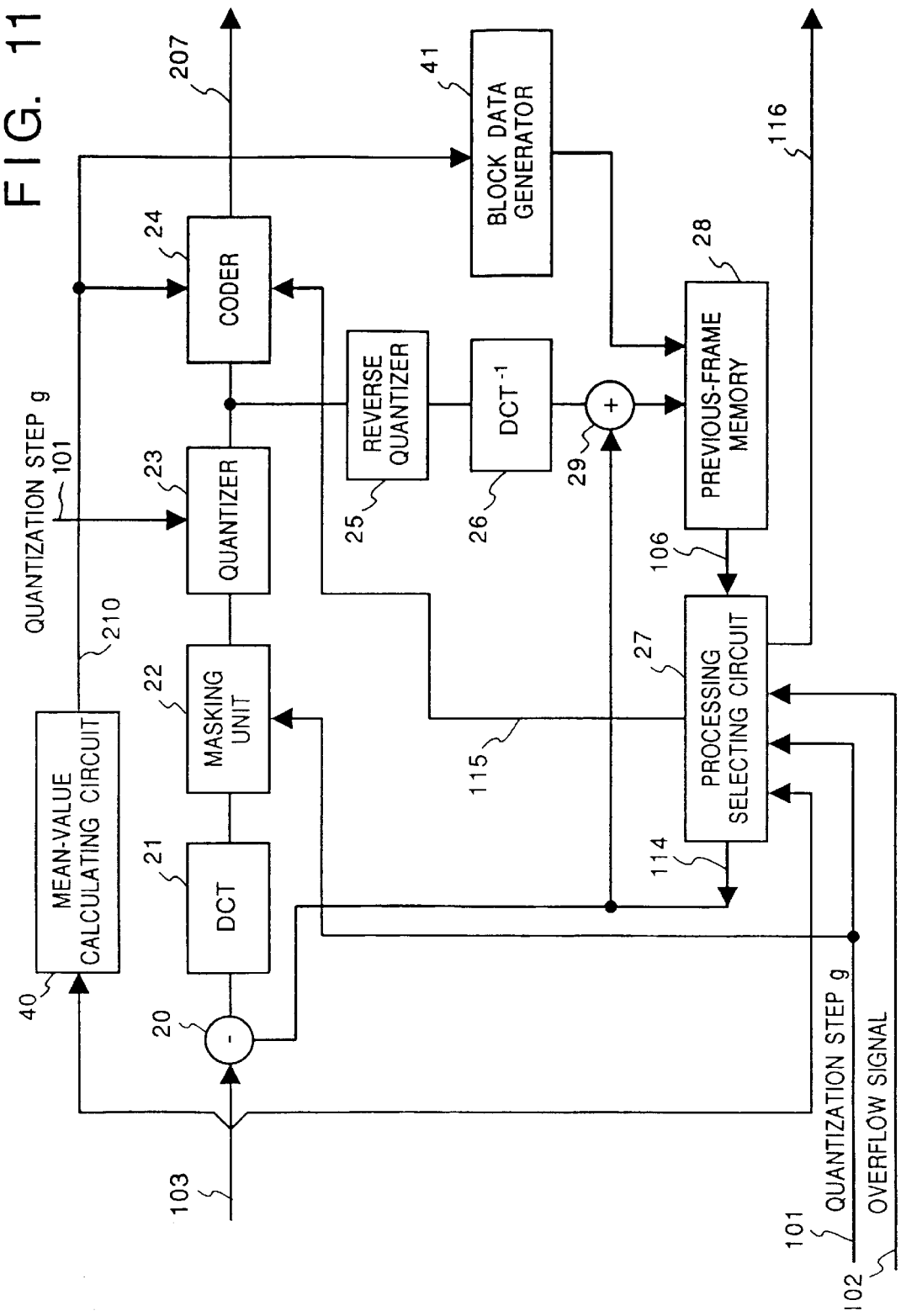

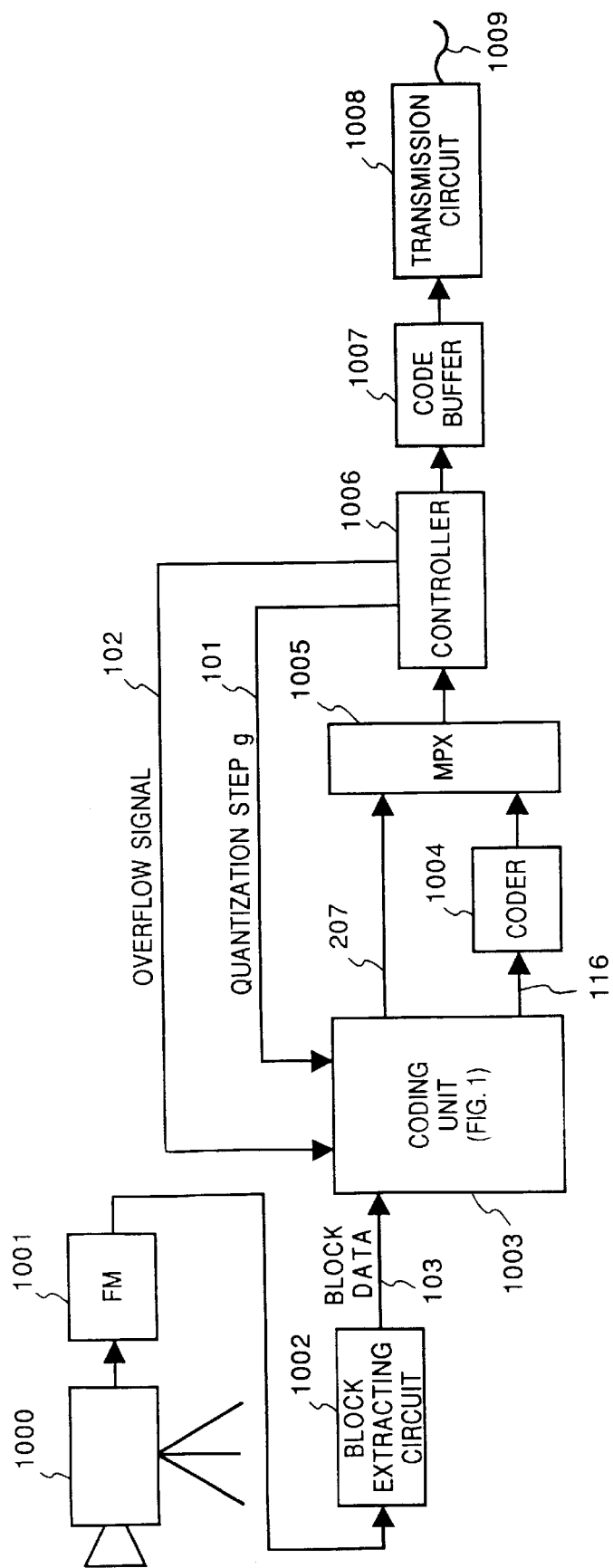

CODING APPARATUS FOR CODING IMAGE DATA USING ONE OF AN INTERPICTURE CODING METHOD AND AN INTERPICTURE MOTION-COMPENSATED CODING METHOD

This application is a division of application Ser. No. 08/034,701 filed Mar. 19, 1993, now U.S. Pat. No. 5,592,302, issued Jan. 7, 1997.

BACKGROUND OF THE INVENTION

This invention relates to a method and apparatus for coding a moving picture.

When 30 frames of an image are displayed sequentially in one second, the human eye is capable of perceiving these sequentially displayed frames as a moving picture. Accordingly, how to code each frame image efficiently without sacrificing quality is important.

In general, three methods of coding frames are known. These are as follows:

1. a method of coding interframe difference;
2. a method of motion-compensated coding of interframe difference; and
3. a method of intraframe coding.

Overall coding of a moving picture is carried out using these methods in suitable fashion.

1. Method of Coding Interframe Difference

Assume that an image of one frame is composed of an n×n pixel block (hereinafter referred to simply as a "block"), by way of example. This coding method involves obtaining the difference between the information of a certain block in a frame to be coded and the information of a block at the same position in the previous frame and then coding this difference. With this method, the frame-to-frame difference becomes closer to zero the higher the frame correlation, or in other words, the smaller the change in the motion of the image frame to frame. Coding efficiency rises as a result. The block of difference data is subjected to a discrete cosine transformation, the transform coefficient data obtained is quantized and Huffman coding is applied. If all of the data becomes zero after quantization, this means that the quantized image is the same as that of the same block in the previous frame. Accordingly, there is no transmission of code data.

2. Method of Motion-Compensated Coding Interframe Difference

This method involves matching a plurality of neighboring blocks centered on the block to be coded and a plurality of neighboring blocks centered on the block at the same position in the previous frame and then selecting the block that is most similar. The difference data thus obtained is subjected to a discrete cosine transformation and quantized. Huffman coding is applied to the quantized data.

3. Method of Intraframe Coding

This coding method involves directly applying the discrete cosine transformation to the entire frame to be coded, quantizing the transform coefficient data obtained and then coding the quantized data. This method provides a higher coding efficiency than is obtained with the two methods described above. However, if frame correlation is small, i.e., if the frame-to-frame image changes, as when there is a change of scene, the dynamic range increases and the amount of information in the coded data increases rather than decreases. Thus, this intraframe coding method is effective in cases where the correlation of a frame of interest with respect to the previous frame is small.

The Moving Picture Experts Group (MPEG) of the International Organization for Standardization (ISO) recommends that a combination of DCT (discrete cosine transformation) and motion compensation be adopted as an international standard. According to this method, data coded by the interframe coding method is transferred as intraframe data in 15-frame units (an interval of 0.5 sec in a case where 30 frames are displayed in one second). More specifically, in a case where coding based upon correlation with the previous frame has continued for a certain number of frames (or for a certain time), quantization error becomes large and this results in an image that appears unnatural to the human eye. The method recommended by the MPEG is for dealing with this problem.

Generally, in a case where intraframe data is produced at a fixed period, no problems arise if the image happens to change dynamically in conformity with this period. However, if the dynamic change in the image occurs just when coding based upon matching with the previous frame is being carried out, an unnatural image is displayed momentarily.

Accordingly, it has been contemplated to change over among the three coding methods at appropriate times. This will be described with reference to the flowchart of FIG. 16.

It should be noted that an overflow signal (signal 304 in FIG. 19) in the following description is a signal indicating that the amount of data held in a buffer memory, which is for temporarily storing the coded data, has attained a predetermined size. The signal possesses a certain amount of margin.

First, as step S101 of the flowchart, it is determined whether an overflow state has been attained. If the overflow state is in effect, it is decided to apply interframe coding processing to the pixel block of interest.

If the overflow state is not in effect, the program proceeds to step S102, at which it is determined whether the motion-compensated coding of interframe difference is to be carried out. More specifically, as shown in FIG. 17, there is a point decided by a difference value at which a block of interest is subjected to motion-compensated coding of interframe difference and a difference value at which a block of interest is not subjected to motion-compensated coding of interframe difference. It is determined whether this point is in a region MC in FIG. 17. Though it may seem acceptable to make the judgment based upon whether the point is above or below a straight line 1700 passing through the origin and having a slope of m=1, vector information regarding the block of interest also is generated by the processing for motion-compensated coding of interframe difference. A straight line 1701 in FIG. 17 is the result of taking account of the amount of data in this vector information.

If it is determined at step S102 that the block of interest lies within the region MC, then it is decided to execute processing for motion-compensated coding of interframe difference.

If it is determined at step S102 that the block of interest lies within a region labeled "INTER", then processing for motion-compensated coding of interframe difference is not executed and the program proceeds to step S103.

It is decided at step S103 to execute either intraframe coding processing or interframe coding processing. More specifically, a variance value of a difference in interframe data in a case where motion compensation is applied to the block of interest and a variance value of a difference in a case where the block of interest is subjected to processing without motion compensation are obtained. If the block of interest resides in a region labeled "INTRA" in FIG. 18, then intraframe coding processing is selected. If the block of interest resides in a region labeled "INTER" in FIG. 18, then processing for coding of interframe difference is selected.

In the selection processing described above, the selection is made using the statistics of a 16×16 pixel block of luminance data.

The construction of the coder will be described with reference to FIG. 19.

As shown in FIG. 19, block data entered from an input line 301 enters a subtracter 30 and a mode decision unit 37. A signal line 304 is an input signal line for an overflow signal of an output-code buffer. This signal enters the mode decision unit 37 and a masking unit 32.

The mode decision unit 37 performs decision processing in accordance with the above-described method upon referring to the block data that has entered from the signal line 303 and the previous-frame data that has been stored in a previous-frame memory 38. When it has been decided that the method of coding interframe difference is appropriate, the decision unit 37 reads data of a block at a position identical with that of the input block out of the previous-frame memory 38 and delivers this data on a signal line 308. When it has been decided that the method of motion-compensating coding of interframe difference is appropriate, the decision unit 37 reads the best matching block data out of the previous-frame memory 38 via line 307 and outputs this data on the signal line 308. When it has been decided that the intraframe coding method is appropriate, the decision unit 37 produces zero data and delivers this data on the signal line 308. At the same time, the decision unit 37 outputs, on a signal line 312, vector data representing the relative positions of the best matching block, which has been obtained by motion compensation, and the coded block.

The subtracter 30 obtains the difference between the block data from the signal line 308 and the input block data from the signal line 302. The resulting difference data enters the masking unit 32 through a DCT (direct cosine transformation) circuit 31.

When the signal from the signal line 304 indicates the overflow state, the mode decision unit 37 selects interframe-difference coding unconditionally. Further, the masking unit 32 masks all of the difference data to zero. The DCT coefficient data from the masking unit 32 is quantized by a quantizer 33 and the quantized data is fed into a coder 34 and a reverse quantizer 35.

Upon referring to a selection-mode signal 311 from the mode decision unit 37, the coder 34 assigns a Huffman code to the quantized DCT coefficient data and outputs the result on a signal line 313. By means of reverse quantization, the reverse quantizer 35 reproduces frequency data identical with that sent to an external decoder, not shown. The reproduced frequency data is transformed into a difference signal again by a reverse-DCT circuit 36; this difference signal is added to the signal from the signal line 308 by an adder 39, thereby reproducing an image identical with that transmitted. This image is stored again in the previous-frame memory 38.

With the processing described above, there is a tendency for the quantization steps to become large if the amount of information possessed by an image is very large with respect to the transmission rate. Accordingly, a drawback is that data that is actually quantized, coded and transmitted is limited to data possessing a sufficiently large amount of information in the state prior to quantization.

Further, the decision regarding which type of coding processing is performed is made based upon a fixed determination. As a consequence, even a block in which no data is left after quantization of the interframe difference, i.e., even a block for which it is unnecessary to send a code in the current quantization step, is subjected to inappropriate coding processing, as a result of which an unnecessary code is transmitted.

In a case where coding processing is performed at a constant bit rate, the average code quantity allocated to one block is extremely small. Consequently, with regard to a block for which the difference between the previous frame and the current frame is small, a method is employed in which the data of the previous frame is used as is and there is no transmission whatsoever of a code indicative of the difference. The code allocation for a block having a large difference is increased correspondingly.

However, when the correlation between two mutually adjacent frames is small over the entire frame, as when there is a change in scene, the coding of all blocks becomes necessary and the codes generated for individual blocks become large. At such time, the above-described coding method involves subjecting one block to coding processing and results in the generation of a large quantity of code. This means that many other blocks can no longer be coded.

SUMMARY OF THE INVENTION

An object of the present invention is to provide a coding method and apparatus in which the criteria for selecting the coding processing are changed based upon a transition in the amount of coded data being generated with respect to at least one frame, thereby making it possible to prevent the generation of unnecessary codes.

Another object of the present invention is to provide a coding method and apparatus in which the size masked after an orthogonal transformation is changed based upon a transition in the amount of coded data being generated with respect to at least one frame, thereby making it possible to suppress excessive generation of code in one block.

A further object of the present invention is to provide a coding method and apparatus in which new coding processing is added to supplement the usual coding processing, thereby making it possible to perform coding processing more efficiently.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A, 8B are diagrams illustrating the masking processing executed by a masking unit in this embodiment;

FIGS. 9A through 9C are diagrams schematically illustrating generated codes in certain states in coding processing according to the embodiment;

FIGS. 10A through 10C are diagrams schematically illustrating amounts of generated code in coding processing according to the embodiment;

FIG. 11 is a block diagram illustrating a moving-picture coding apparatus according to a second embodiment of the present invention;

FIG. 21 is a block diagram illustrating a moving-picture coding aparatus including the coders according to the first and second embodiments.

DESCRIPTION OF THE PREFERRED EMBODIMENTS

Preferred embodiments of the present invention will now be described with reference to the drawings.

[First Embodiment]

Figure 1:
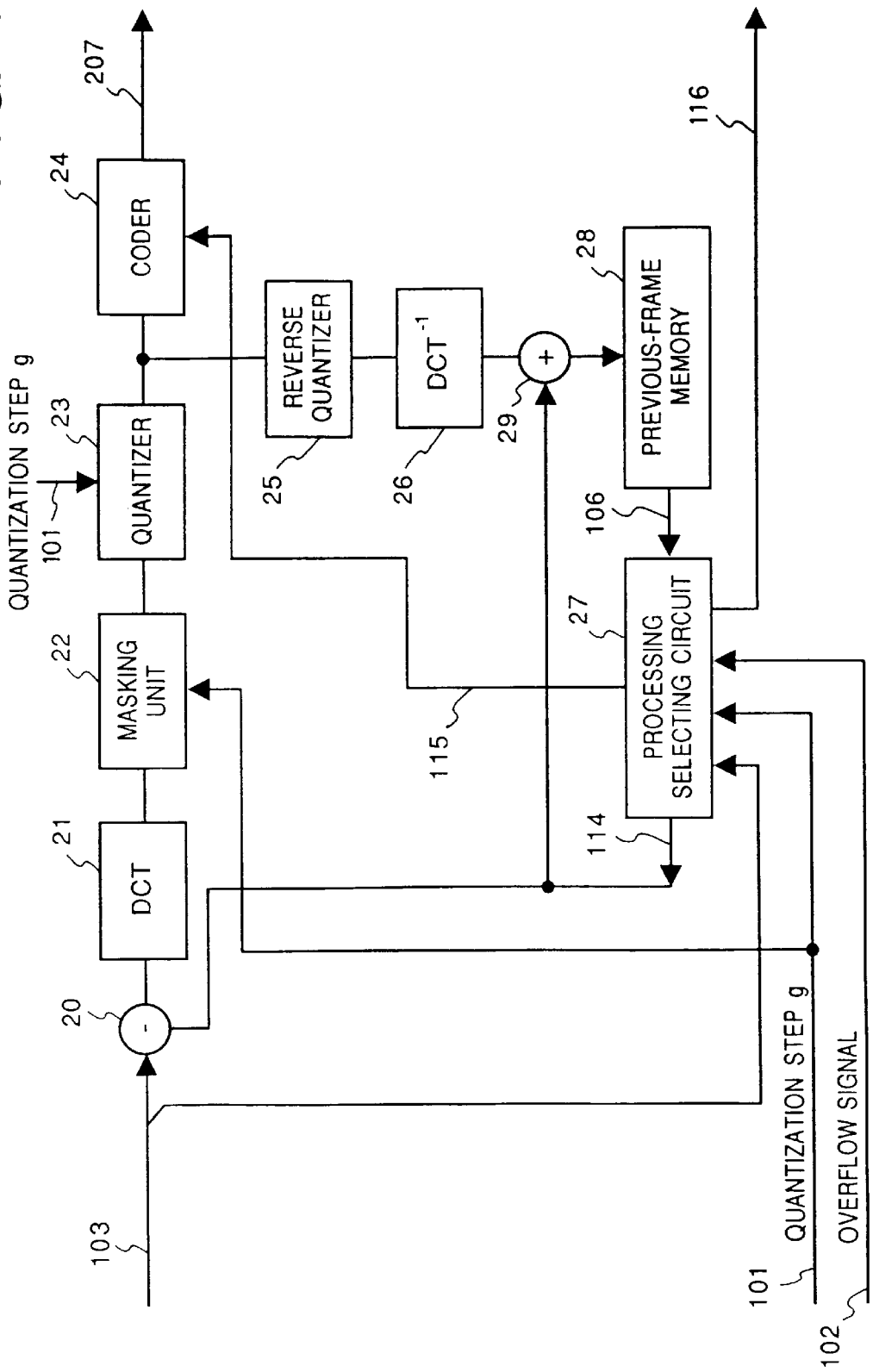
FIG. 1 is a block diagram illustrating a moving-picture coding apparatus according to an embodiment of the present invention.

FIG. 1 is a block diagram illustrating a coding apparatus embodying the present invention. The apparatus will be described first with reference to FIG. 1.

Figure 19:
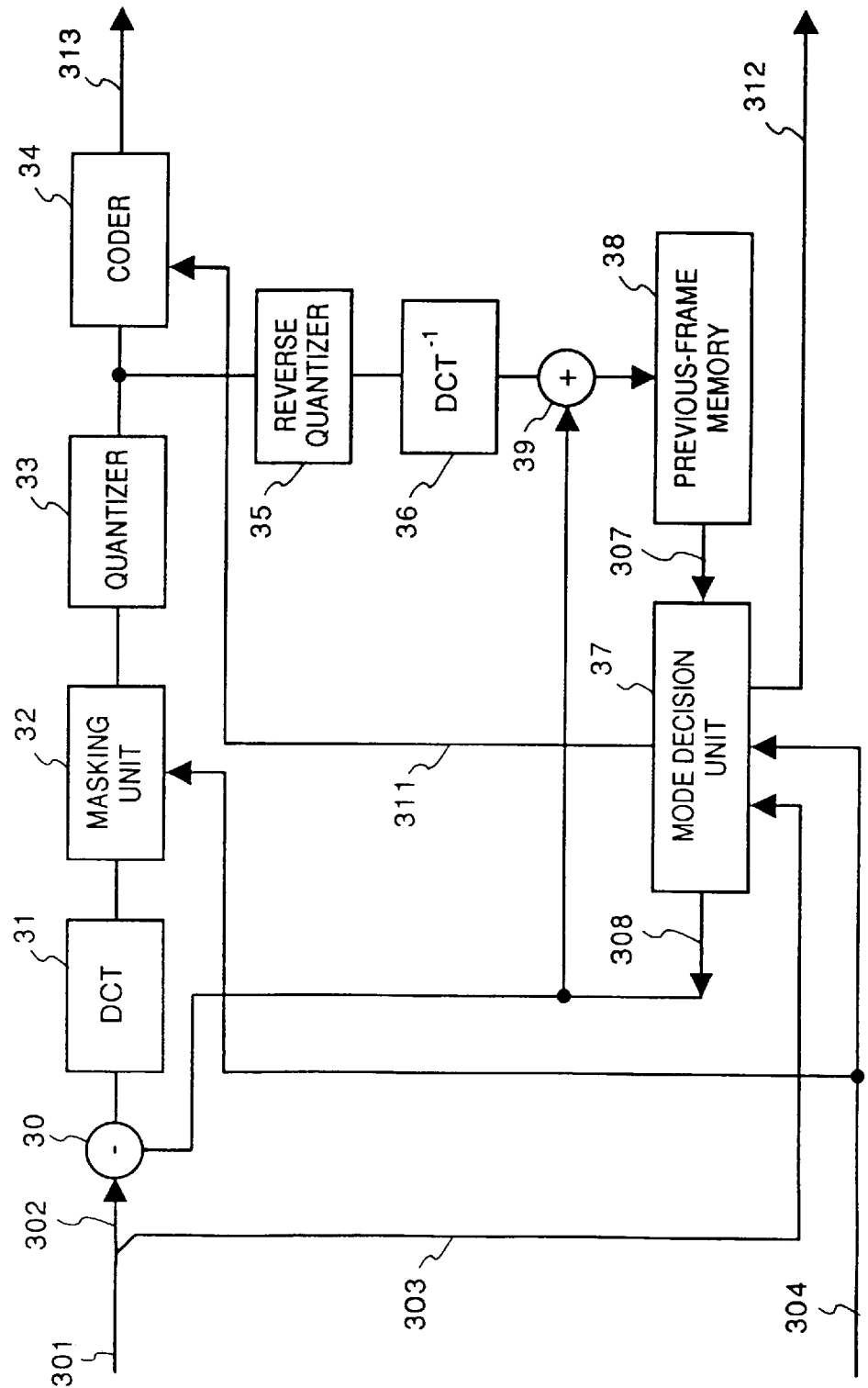
FIG. 19 is a block diagram illustrating a moving-picture coding apparatus.

The principal differences between this apparatus and that shown in FIG. 19 described earlier are that a processing selecting circuit 27 is provided instead of the mode decision unit 37 of FIG. 19, and that additional signal lines are provided. Other components are the same as those shown in FIG. 19.

The block data that has entered from an input line 103 in FIG. 1 is fed into the processing selecting circuit 27 and a subtracter 20. A signal line 102 is an input signal line for an overflow signal of an output-code buffer (not shown). This signal enters the processing selecting circuit 27. It should be noted that the meaning of the overflow signal is as set forth earlier.

The processing selecting circuit 27 decides the processing method, in accordance with a processing method described below, upon referring to the block data that has entered from the signal line 103, the value of a quantization step g from a signal line 101 and the previous-frame data that has been stored in a previous-frame memory 28. When it has been decided that the method of coding interframe difference is appropriate, the signal selecting circuit 27 reads data of a block at a position identical with that of the input block out of the previous-frame memory 28 and delivers this data on a signal line 114.

When it has been decided that the method of motion-compensated coding of interframe difference is appropriate, the processing selecting circuit 27 reads the best matching block data (having the most similar structure) out of the previous-frame memory 28 via line 106 and outputs this data on the signal line 114. At the same time, the processing selecting circuit 27 outputs, on a signal line 116, vector data representing the relative position between of the best matching block, which has been obtained by motion compensation, and the block to be coded. When it has been decided that the intraframe coding method is appropriate, the processing selecting circuit 27 produces zero data and delivers this data on the signal line 114. The block data on the signal line 114 is delivered to a subtracter 20 and an adder 29.

The subtracter 20 obtains the difference between the block data from the signal line 114 and the input block data from the signal line 103. The resulting difference data enters a masking unit 22 through a DCT (direct cosine transformation) circuit 21.

When the overflow signal from the signal line 102 indicates the overflow state of the code buffer, the processing selecting circuit 27 selects interframe-difference coding unconditionally. The DCT coefficient data from the masking unit 22 is quantized by a quantizer 23 and the quantized data is fed into a coder 24 and a reverse quantizer 25.

Upon referring to a selection-mode signal 115 from the processing selecting circuit 27, the coder 24 assigns a Huffman code to the quantized DCT coefficient data and outputs the result to an output code buffer on a signal line 207. By means of reverse quantization, the reverse quantizer 25 reproduces frequency data identical with that sent to an external decoder, not shown. The reproduced frequency data is transformed into a difference signal again by a reverse-DCT circuit 26. The output data of the reverse-DCT circuit 26 and the block of the previous frame obtained from the signal line 114 are added by the adder 29, thereby reproducing an image identical with that transmitted. This image is stored again in the previous-frame memory 28.

Figure 2:
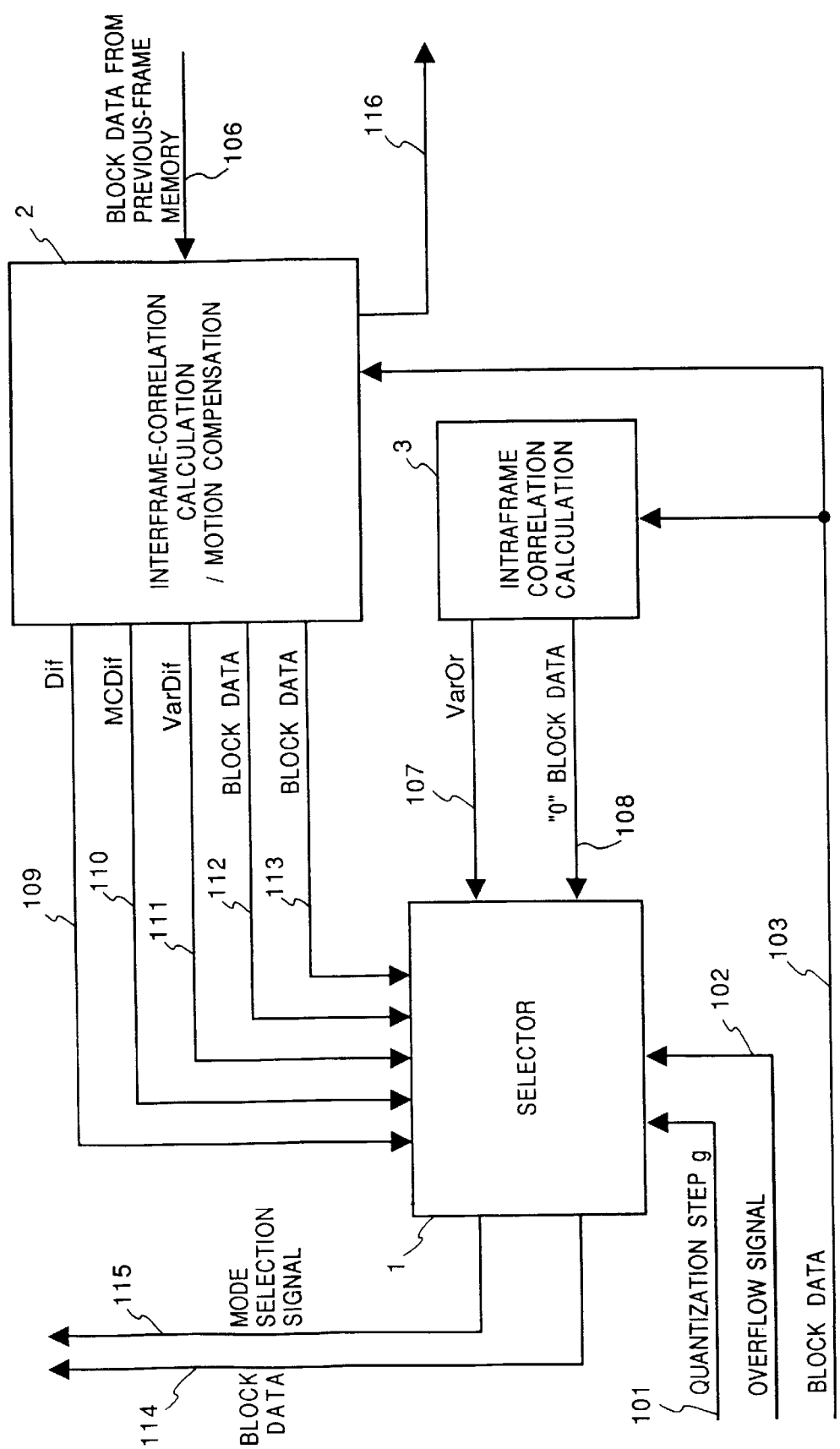
FIG. 2 is a detailed block diagram showing a processing selecting circuit in FIG. 1.

The details of the processing selecting circuit 27 shown in FIG. 1 are illustrated in FIG. 2.

As shown in FIG. 2, the signal line 101 is for a signal indicative of the quantization step g, and the signal line 102 is for entering the overflow state. The image block data enters an intraframe-correlation calculating circuit 3 and an interframe-correlation calculating/motion-compensating circuit 2 from the signal line 103.

The signal 101 indicative of the quantization step g is a value which indicates the number of divisions of transformation coefficients in an orthogonal transformation. In other words, this is a signal which indicates the width of quantization range. The smaller the value of this signal, the more quantization error is suppressed and the higher the quality that is maintained in the transformation. However, there is a tendency for the transformed data to become redundant. The signal indicative of the quantization step g is decided depending upon the degree to which coded data produced thus far is accumulated. Of course, in a case where the data amount of past coding is large, the value of the quantization step g becomes large. Conversely, the value of g decreases as the data amount of coding decreases. The principle according to which the quantization step g is generated will be described later.

On the basis of the quantization step g applied thereto, the masking circuit 22 changes the masked range of high-frequency components in the orthogonal transformation. More specifically, the larger the value of the quantization step g, the higher the ratio of AC-component masking. The details of this masking processing will be described later.

Further, the quantizer 23 quantizes the data from the masking unit 22 in the quantization step corresponding to the quantization step g signal 102.

The interframe-correlation calculating/motion-compensating circuit 2 reads the block data of the previous frame out of the previous-frame memory 28 via the signal line 106. The circuit 2 calculates the absolute values of the differences between pixels within the block and then calculates the mean value, thereby calculating a mean value Dif of the absolute value interframe difference. The calculated Dif value is outputted on a signal line 109. Further, the circuit 2 outputs, on a signal line 112, block data of the previous frame whose position is identical with that of the block of interest.

In addition to the foregoing processing, the circuit 2 retrieves the best matching block, in the previous frame, that has the smallest mean of the absolute values in the vicinity of the position of the block of interest, and outputs this block from a signal line 113. Further, the circuit 2 calculates a motion-compensated mean value MCDif of the absolute values of interframe difference between the obtained block and the input block from the signal line 103 and outputs this mean value on a signal line 110. The methods of calculating Dif and MCDif are as indicated by Equations E-1, E-2 below.

Further, the circuit 2 calculates a motion-compensated interframe square mean value VarDif in accordance with an Equation E-3 and outputs VarDif from a signal line 111.

As for the motion compensation in the circuit 2, Equation E-4, shown below, is used to calculate matching values of blocks offset, in units of one pixel, above and below and to the left and right of a block at the same position in the previous frame, with the offset being performed within a distance range of seven pixels. A block that gives the value among these values is adopted as the best matching block.

With regard to the block data that has entered via the signal line 103, the intraframe correlation calculating circuit 3 obtains a variance value VarOr in accordance with Equation E-5, delivers this value to a selector 1 via a signal line 107, generates a dummy block of all-0 data and also delivers this block to the selector 1 from a signal line 108.

$$\text{Dif}=1/N^2 \Sigma\Sigma|B_{ij}-PB_{ij}| \quad \text{(Equation E-1)}$$

where N represents block size, $B_{ij}$ a coded block of interest and $PB_{ij}$ a block in the previous frame.

$$\text{MCDif}=1/N^2\Sigma\Sigma|B_{ij}-PB_{i+m,j+n}| \quad \text{(Equation E-2)}$$

where PB represents the best matching block based upon motion compensation, and m, n= . . . −3, −2, −1, 1, 2, . . . holds.

$$\text{VarDif}=1/N^2\Sigma\Sigma(B_{ij}-PB_{i+m,j+n})^2 \quad \text{(Equation E-3)}$$

$$\text{matching value}=\Sigma\Sigma(B_{ij}-MCB_{ij})2 \quad \text{(Equation E-4)}$$

where MCB represents an adjacent block in the previous frame.

$$\text{VarOr}=1/N^2\Sigma\Sigma(B_{ij})2-\{1/N^2\Sigma\Sigma(B_{ij})\}^2 \quad \text{(Equation E-5)}$$

In accordance with the entered signals Dif 109, MCDif 110, VarDif 111, VarOr 107 and the g value 101 and overflow information 102, the selector 1 selects the block data on signal line 112, 113 or 108 and outputs the selected block data on signal line 114.

Operation will be described with reference to the flowchart of FIG. 3, which illustrates the method of deciding the signal line to be selected in the selector 1.

Figure 3:
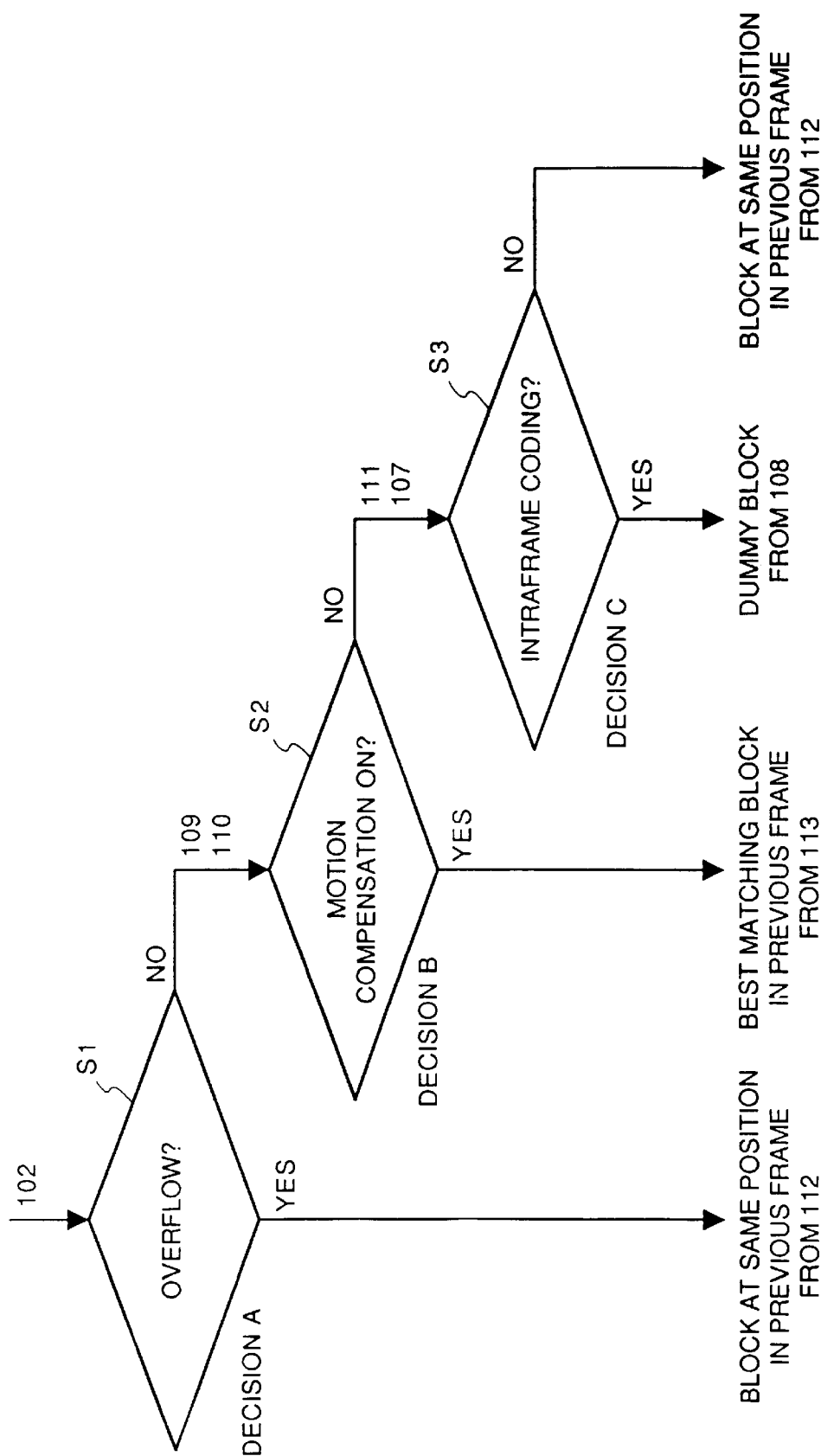
FIG. 3 is a flowchart showing the selection processing executed by the processing selecting circuit.

At step S1, which involves a decision A in FIG. 3, it is determined whether the amount of code generated thus far is large and the overflow state is in effect. If overflow has occurred, block data at the identical position in the previous frame is selected from the signal line 112 in order to select the method of coding interframe difference.

If overflow has not occurred at step S1, the program proceeds to a decision B at step S2 where it is decided whether or not to perform motion-compensated coding of interframe difference. More specifically, the decision is based upon Dif, MCDif from signal lines 109, 110. If the relationship between MCDif for the case in which motion compensation is applied and Dif for the case in which motion compensation is not applied lies within the range MC in accordance with the characteristic shown in FIG. 4, the best matching block data 113 based upon motion compensation is selected in order to select the method of motion-compensated coding of interframe difference. A threshold line f(g) for this decision varies depending upon the g value from the signal line 101.

If the relationship resides in the range INTER and it is determined that motion compensation is not to be performed, the program proceeds to a decision C at step S3 without the method of motion-compensated coding of interframe difference being selected. In accordance with VarDif, VarOr from the signal lines 111, 107, it is determined at step S3 whether to use the interframe coding method or the intraframe coding method based upon a boundary line F(g) illustrated in FIG. 5. The boundary line F(g) also is a function of g of the kind indicated by the illustrated equation and varies in accordance with the value of g. Within the region "INTRA", intraframe coding processing is executed and therefore "0" block data on the signal line 108 is selected. As a result, the data of the block of interest is outputted to the DCT unit 21 as is without being changed by the subtracter 20. Within the region "INTER", interframe coding is decided and a block at the identical position in the previous frame is selected from signal line 112.

Next, a circuit for generating the quantization step signal g 101 in this embodiment will be described.

Figure 20:
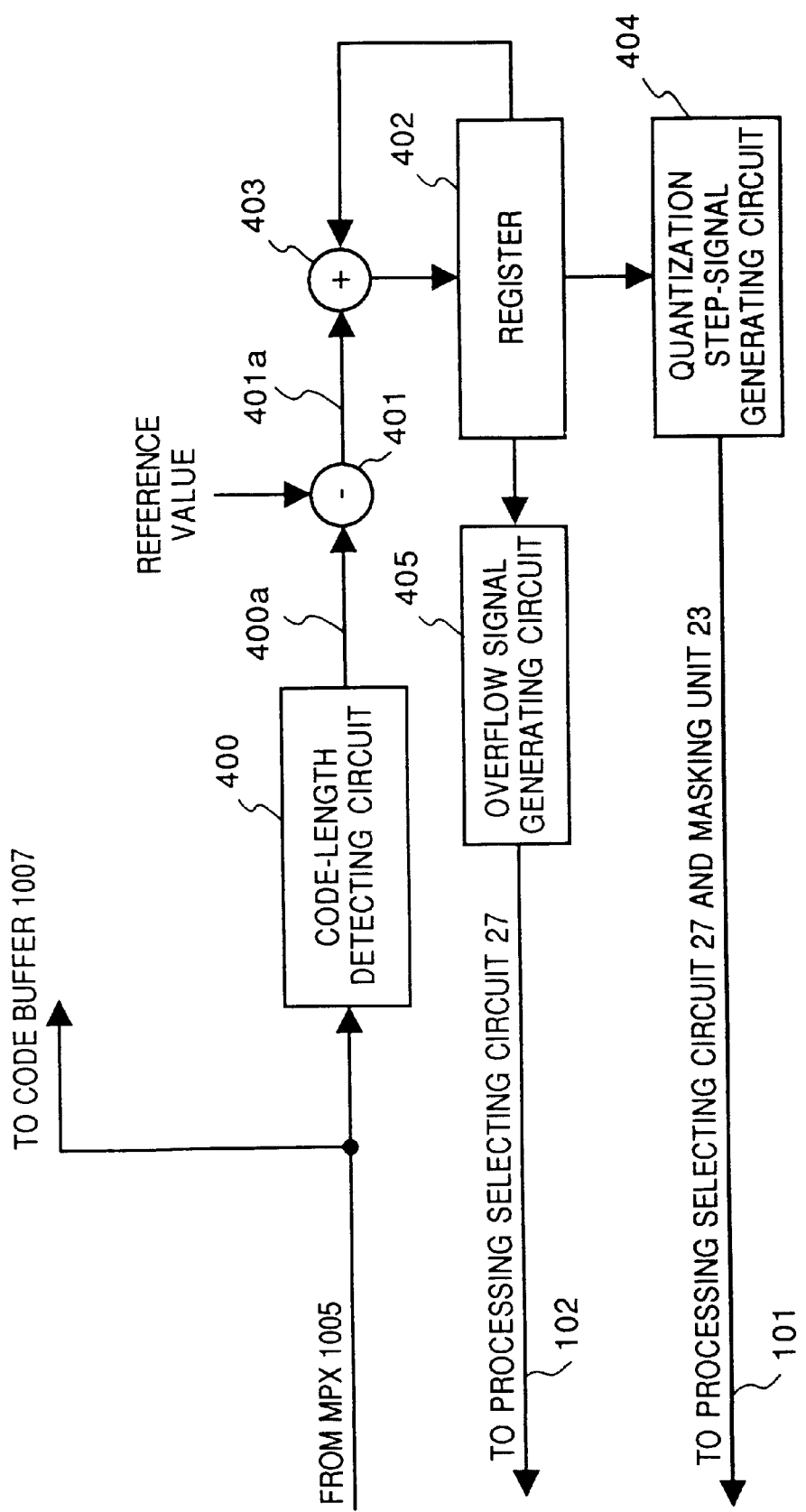
FIG. 20 is a diagram illustrating a specific example of a circuit for generating a signal indicative of a quantization step g in this embodiment.

FIG. 20 illustrates a specific example of a quantization-step signal generating circuit 404 and the peripheral devices. The value of the quantization step g in this embodiment varies in units of 16 lines (this unit will be referred to as a "block line" hereinafter) since one block has a 16×16 dot size in this embodiment. In other words, the quantization step g does not change on one block line. The reason for this will be described below.

As shown in FIG. 20, data including coded data with regard to block data outputted by the coder 24 shown in FIG. 1 is transferred to an output code buffer and outputted also to a code-length detecting circuit 400. The latter detects the number of valid bits in the code data of the block of interest and outputs the detected value to a subtracter 401 as a signal 400a. The subtracter 401 obtains the difference between this value and a previously set reference value and outputs a signal indicating how much larger or how much smaller the generated code is in comparison with the reference value.

At the start of the coding of one frame, "0" is set in a register 402 as an initial value. The data stored in the register 402 is supplied to an adder 403. In other words, resetting is performed in synchronism with a vertical synchronizing signal (not shown) of one frame to be coded. The adder 403 adds the value from the register 402 and the value from the subtracter 401 and feeds back the sum to the register 402. Accordingly, this circuit operates whenever code data regarding block data is generated, as a result of which a value indicating how much larger or how much smaller the generated code data is in comparison with the reference number of code bits is stored and held.

A quantization-step signal generator 404 incorporates a counter for counting a horizontal synchronizing signal. Whenever 16 horizontal synchronizing signals are detected by the counter, the value held in the register 402 is read out, a three-bit signal indicative of the quantization step g is generated based upon this value and this output is held. Owing to the three-bit signal line, a total of eight types of signals of 0~7 can be generated. In this embodiment, however, signals of 0~5 are generated.

In a case where the value stored in the register 402 at the end of one block line of coding is large, this means that the quantity of coded data in the immediately preceding block line was large in comparison with the reference code data quantity. In this case, therefore, the signal indicative of the quantization step g is enlarged so that the generation of coded data is suppressed.

Further, numeral 405 denotes an overflow signal generating circuit which generates the overflow signal 102 in accordance with the value of the register 402.

As a result of the foregoing, the borderline that decides whether processing for coding of interframe difference, processing for motion-compensated coding of interframe difference or processing for intraframe coding is to be employed varies in units of one block line depending upon the size of the quantization step. More specifically, the criterion for deciding the type of coding processing to be executed varies depending upon the size of the quantization step. This result has an effect also upon the coder 24 and contributes to preventing the generation and transmission of unnecessary codes.

Figure 4:
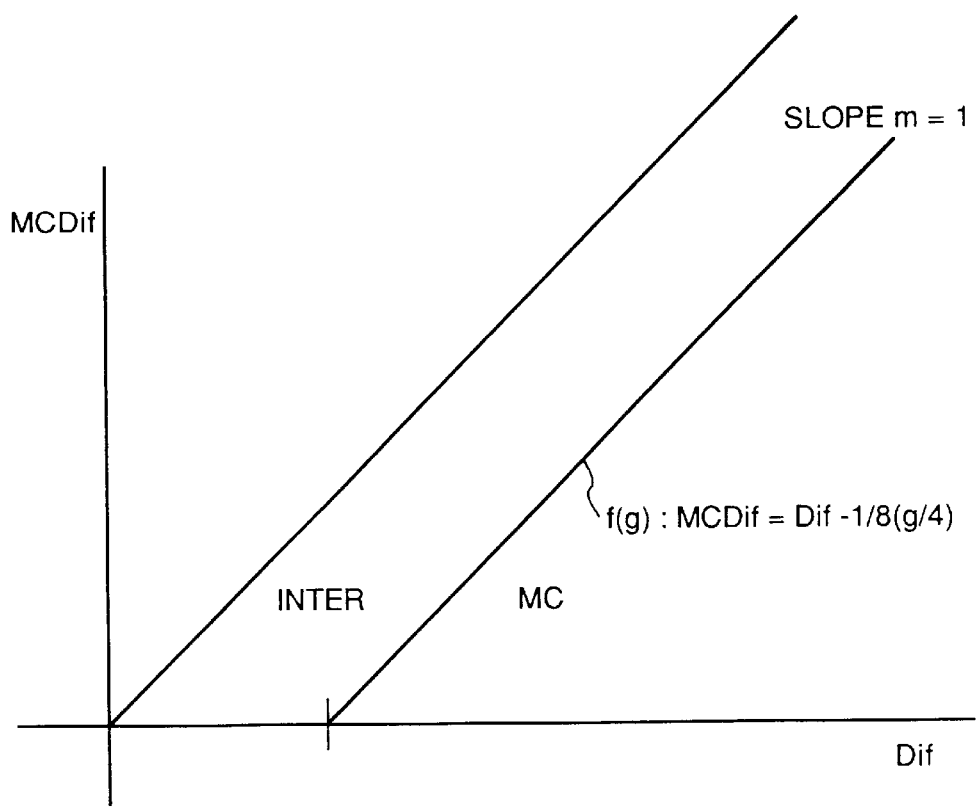
FIG. 4 is a diagram showing a criterion for deciding whether a method of motion-compensated coding of interframe difference is to be performed.
Figure 5:
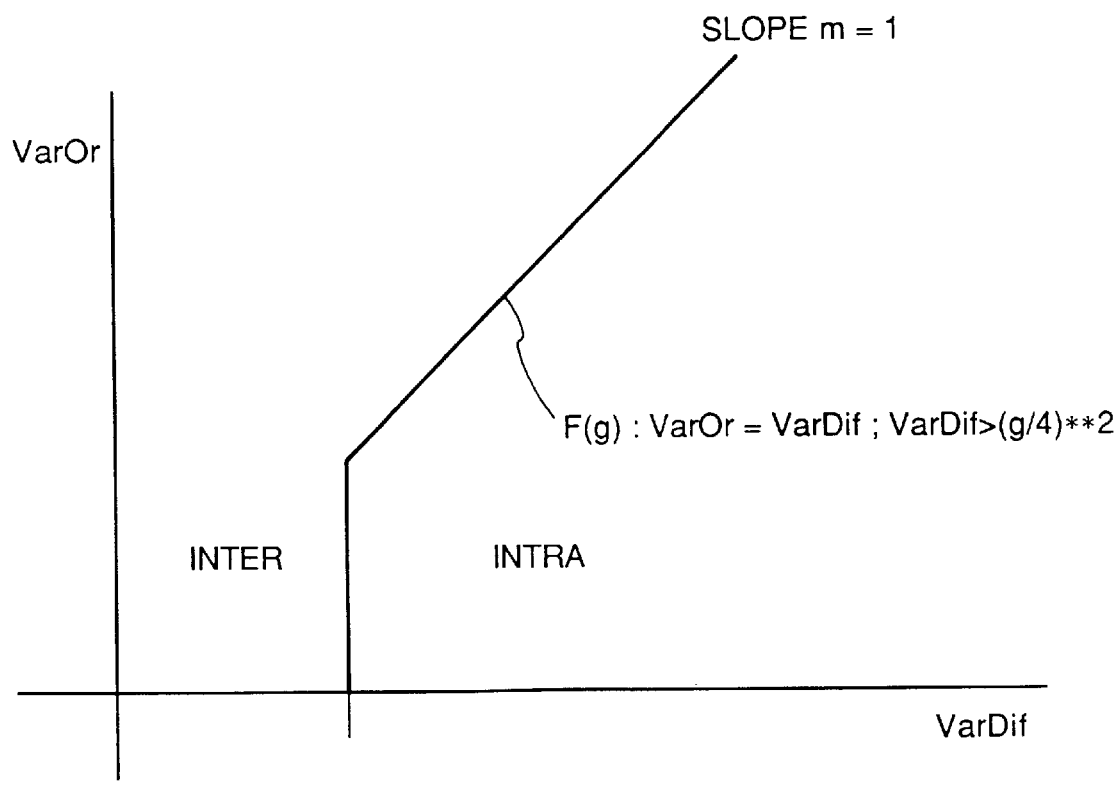
FIG. 5 is a diagram showing a criterion for deciding whether an intraframe coding method or a method of coding interframe difference is to be selected.

It should be noted that the processing selecting method for deciding whether the method of motion-compensated coding of interframe difference is to be performed and the processing selecting method for deciding whether to perform the method of interframe coding or to select the method of coding interframe difference are not limited to the criteria of FIGS. 4 and 5. It will suffice to select the appropriate method of determination at the appropriate time. Other methods of determination shown in FIGS. 6 and 7 may be employed instead of the methods shown in FIGS. 4 and 5.

Figure 6:
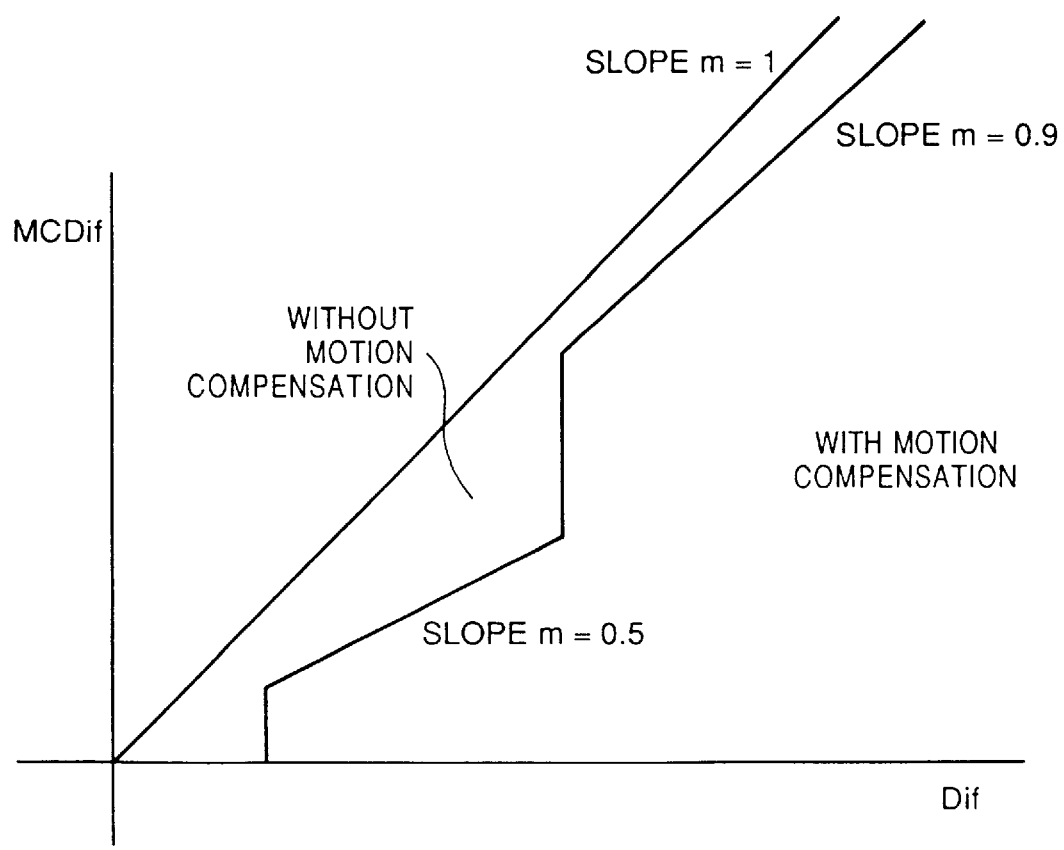
FIG. 6 is a diagram showing another criterion for deciding whether a method of motion-compensated coding of interframe difference is to be performed.
Figure 7:
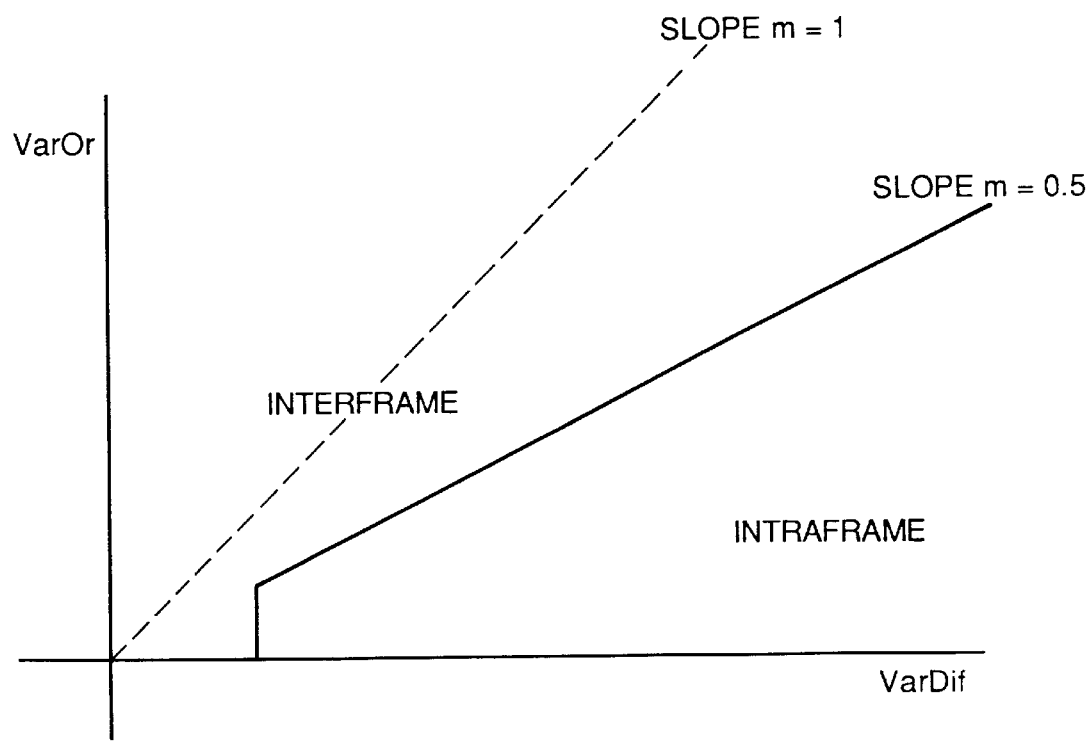
FIG. 7 is a diagram showing another criterion for deciding whether an intraframe coding method or a method of coding interframe difference is to be selected.

FIG. 6 is a diagram showing another processing selecting method for deciding whether to perform the method of motion-compensated coding of interframe difference according to this embodiment, and FIG. 7 is a diagram showing another processing selecting method for deciding whether to perform the method of interframe coding or to select the method of coding interframe difference according to this embodiment. Within the range in FIG. 6 in which motion compensation is applied, the method of motion-compensated coding of interframe difference is executed. Within the range in which motion compensation is not applied, the program proceeds to step S3 and the method of coding interframe difference is performed based upon the criterion shown in FIG. 7. In a range within one frame, intraframe coding is executed. Within the range between frames, the method of coding interframe difference is selected and executed.

Control of the amount of code in the foregoing processing according to this embodiment will now be described.

When data is transmitted, control for bringing the generated amount of coded data into conformity with the transmission speed is required. In this embodiment, achieving conformity with the transmission speed is executed through the method described below.

Specifically, the generated code is stored temporarily in the output code buffer, which has a size for an amount of code corresponding to one frame. The buffer successively transmits the code at a speed conforming to the transmission rate. The coder monitors the degree of sufficiency of the code within the buffer. When too much code is generated, the quantization step g signal is enlarged so that code generation is suppressed. Conversely, when code generation falls below the transmission rate, the quantization step is made smaller to promote the generation of code. When the buffer overflows, the quantization step is made very large so that code generation is suppressed greatly. By virtue of the foregoing operation, fixed amount of code is generated per unit time.

The masking unit 22 in this embodiment will now be described.

In general, there is a tendency for a large amount of code to be generated in intraframe coding processing. Accordingly, when the masking unit 22 in this embodiment is informed by the processing selecting circuit 27, via the signal line 115, of the fact that intraframe coding processing has been selected, the masking unit 22, irrespective of the signal indicative of the quantization step g, leaves only the DC component at column one, row one in the matrix obtained from the DCT unit 21 and masks (i.e., makes "0") all of the other AC components. This state is illustrated in FIG. 8A.

When the masking unit 22 receives a signal informing it of the fact that coding is performed by subjecting the block of interest to processing for coding of interframe difference or processing for motion-compensated coding of interframe difference, the masking unit 22 varies the masked region, as shown in FIG. 8B, in dependence upon the value of the quantization step g.

More specifically, as shown in FIG. 8B, the larger the value g of the quantization step, the larger the masked region is made; the smaller the value g of the quantization step, the smaller the masked region is made. The reason for this is that a small value for the quantization step g means that code generated up to the previous block is small. In this case, therefore, this means that it does not matter if the orthogonal transformation coefficients are subdivided into a number of stages; hence, the masked region is made small. If the quantization step g tends toward larger values, the masked region tends to move from higher frequency components where there is little influence toward lower frequency components and the masked region is enlarged, as illustrated.

As a result of the foregoing, masking is performed based at the quantization step g, namely a size conforming to the amount of code generated in coding processing, and it is possible to suppress the excessive generation of code in one block.

The coder 24 according to this embodiment will now be described.

The coder 24 of this embodiment basically subdivides 16×16 luminance data (e.g., Y data) into four pixel blocks of 8×8 each and subdivides color-difference data into two color difference blocks of 8×8 each at positions identical with those of the 16×16 pixel block, thereby producing a total of six blocks. The two color-difference blocks (e.g., I, Q) are given an 8×8 block size by being extracted at an interval of two pixels both vertically and horizontally in the 16×16 pixel block. In 16×16 block units within the input image, the four luminance blocks and the two color-difference blocks are coded as units. The reason why the number of color-difference blocks is small is that the intervals at which frames are displayed is momentary in case of a moving picture, and the effect that the color-difference data in such case has upon the human eye is not that important.

The coder 24 in this embodiment receives the selection-mode signal 115 outputted by the processing selecting circuit 27 and performs coding of the block of interest. FIGS. 9A through 9C illustrates the format of coded data outputted based upon the selection-mode signal. Each item of coded data will now be described.

i) Coding of Interframe Difference

In processing for coding of interframe difference, the code begins with an ID code indicating the processing mode (the ID code is a code indicating that the data which follows it is data based upon the coding of interframe difference). The ID code is followed by the value of the quantization step g. In accordance with this embodiment, the value of the quantization step g is not changed by coding of one block line. Accordingly, the value of the quantization step g is inserted at the coded data of the leading block of one block line. The ID in the coded data of the blocks from the second onward is made to contain the fact that the value of the quantization step is the same, and data of the quantization step g is not inserted. Thus, the amount of coded data generated is suppressed further. This is the reason for not changing the value of the quantization step g in one block line. It should be noted that the timing at which the data of the quantization step g is inserted is the same in both the processing for motion-compensated coding of interframe difference and the processing for intraframe coding.

The ID code or the data of the quantization step g is followed by a code indicating the number of blocks actually coded (that is, blocks for which a significant frame difference has been confirmed) among the total of six blocks, namely the four 8×8 pixel blocks corresponding to the luminance data and the two 8×8 pixel blocks corresponding to color difference. This is followed by coded block data of the number of blocks indicated by the coded data. The code of each item of block data is composed of spectrum data and an EOB (end-of-block) code. In FIG. 9A, the number of significant blocks is four.

ii) Motion-Compensated Coding of Interframe Difference

In processing for motion-compensated coding of interframe difference, there is an ID code indicating the processing mode, as shown in FIG. 9B. The ID code is followed by the quantization step g, and then by a code representing a motion vector. Next there is a code representing the number of blocks actually coded among the total of six blocks, namely the four 8×8 pixel blocks corresponding to the luminance data and the two 8×8 pixel blocks corresponding to color difference. The codes for blocks follow in the given number. The codes for individual blocks comprise spectrum data and an EOB code.

iii) Intraframe Coding

In intraframe coding, first there is an ID code and then the quantization step g, as illustrated in FIG. 9C. This is followed by codes for all six blocks. The codes for the individual blocks include a code (DC component) representing a DC component of fixed length, and then a code (AC component) representing an AC component. Finally, an EOB code is attached.

In the description given above, a discrete cosine transformation is applied to an original-image block or a difference block regardless of the coding processing method within a frame or between frames, and the spectrum data is subjected to coding processing. The codes illustrated in FIGS. 9A through 9C are generated in each of these processing methods, as mentioned above.

Consequently, the codes generated in coding processing in a case where the interior of a 16×16 pixel block of luminance data is almost flat (the values are the same), the interior of an 8×8 block of two items of color-difference data also is flat and, furthermore, the previous frame image is an image having many AC components (this situation tends to arise when there is a transition from a complicated image to a flat image owing to scene change) become as illustrated in FIGS. 10A~10C.

Thus, in accordance with the first embodiment as described above, a highly efficient coding method can be provided in which a method of selecting a processing mode is changed depending upon the size of the quantization step, thereby making appropriate processing selection possible so that the generation and transmission of unnecessary codes can be prevented.

Further, in the arrangement described above, high-frequency components of transformation coefficients that result from the discrete cosine transformation of block-to-block difference in the coding processing are masked at a size in accordance with the amount of generated code, thereby making it possible to suppress the excessive generation of code in one block.

[Second Embodiment]

In the embodiment described above, the format of the generated code data in the coding processing is shown, basically, in FIGS. 10A~10C. Consequently, there is the possibility that the quantity of generated code based upon the three types of coding processing will be large with regard to an image, of minimum redundancy, to be coded henceforth, regardless of the coding processing used.

More efficient coding processing can be carried out by providing, in addition to the coding processing based solely upon the orthogonal transformation coding in the foregoing embodiment, coding processing in which adaptive use is made of coding processing in a frequency space based upon use of orthogonal transformation and coding of intrablock mean-value data in actual space. For example, more efficient coding processing can be realized by newly providing coding processing in which the mean value of a 16×16 pixel block of luminance data and the mean value of 8×8 pixels of the corresponding two color-difference blocks are subjected to fixed-length coding.

A second embodiment according to the present invention in which an original image is subjected to mean-value coding of the kind mentioned above will now be described.

Figure 15:
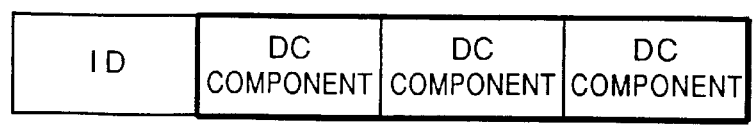
FIG. 15 is a diagram showing generated code quantity in mean-value coding processing used in the second embodiment.
Figure 16:
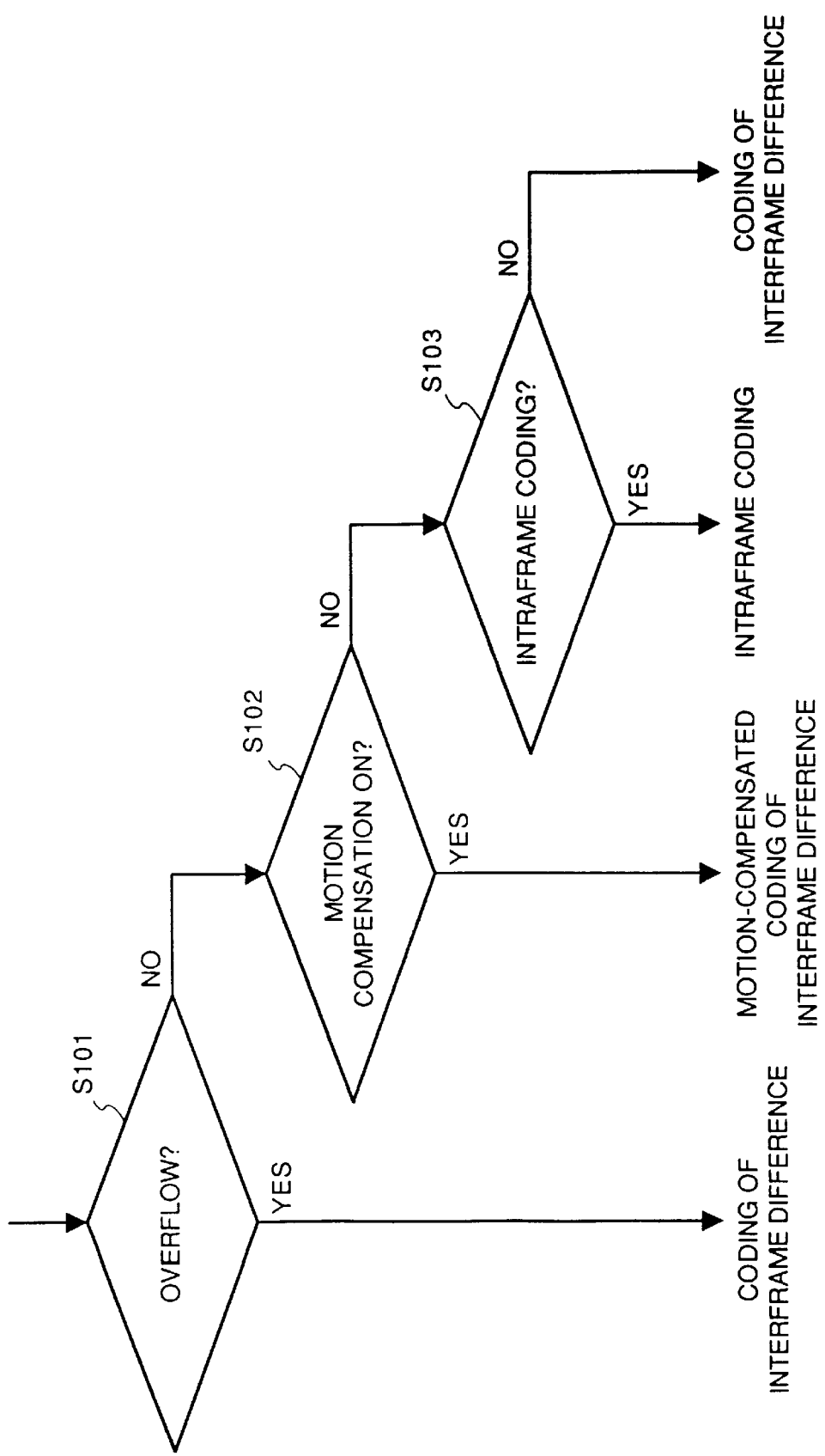
FIG. 16 is a flowchart showing an example of a method of selecting processing for coding.
Figure 17:
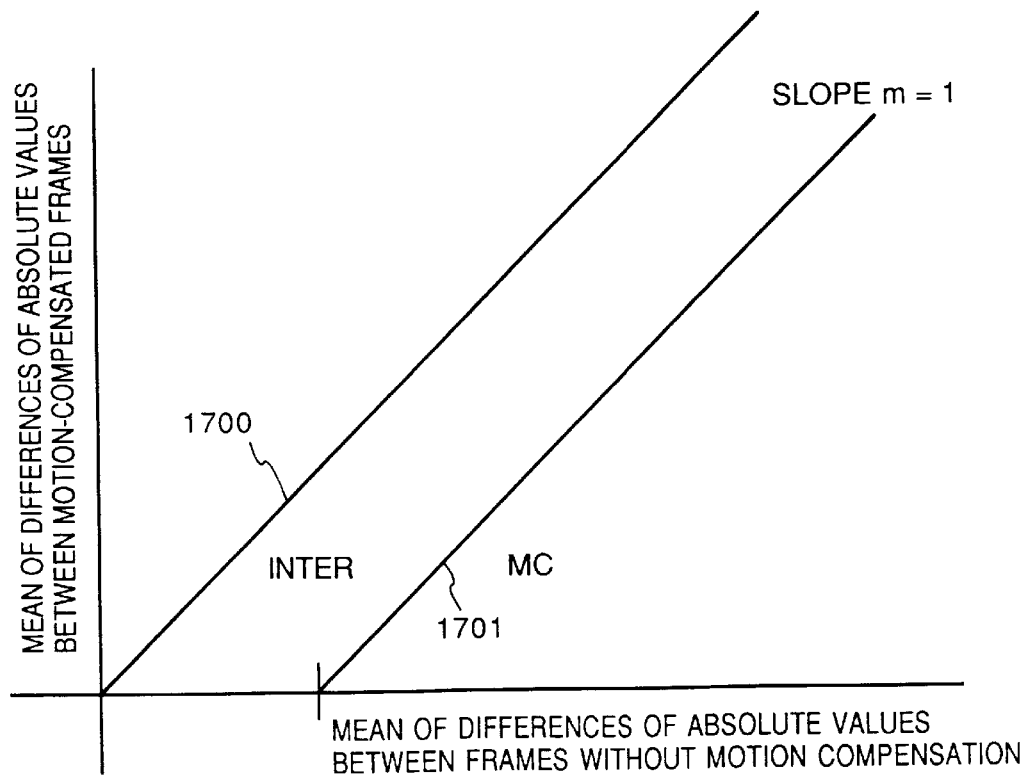
FIG. 17 is a diagram for describing whether an intraframe coding method is to be performed or whether a method of motion-compensated coding of interframe difference is to be selected.
Figure 18:
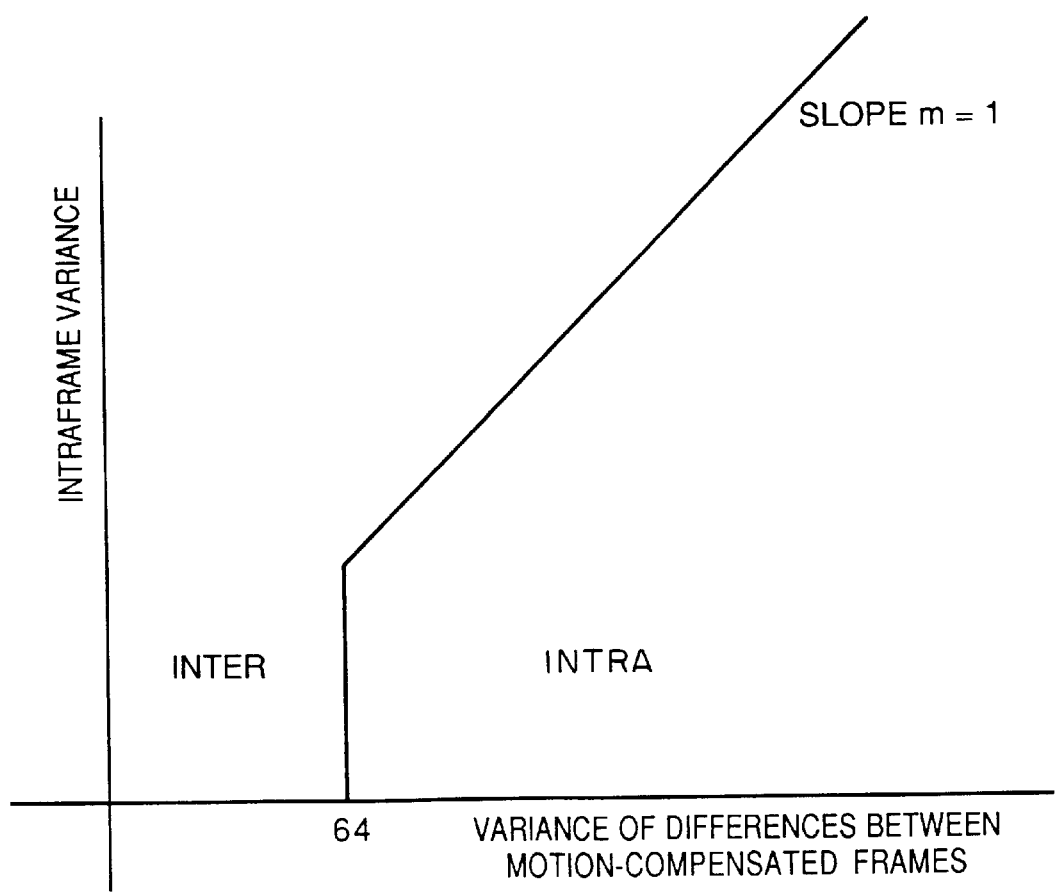
FIG. 18 is a diagram for describing whether an intraframe coding method is to be performed or whether a method of coding of interframe difference is to be selected.

FIG. 15 illustrates the format of a code in processing for the mean-value coding of an original image according to the second embodiment. The structure of the codes in processing for coding of interframe difference, processing for the motion-compensating coding of interframe difference and processing for intraframe coding are identical to those shown in FIGS. 10A~10C of the first embodiment described above. Accordingly, only the code structure in processing for the mean-value coding of an original image will be described.

In processing for the mean-value coding of an original image, first there is a code indicating the processing mode (processing for the mean-value coding of an original image), then a code representing the mean value of 16×16 pixels of luminance block data, and then a code representing the mean value of 8×8 pixels of two color-difference blocks. Since these use fixed-length codes, there is no EOB code used in the other processing modes. That is, if the apparatus on the decoding side generates this ID code, the bit number of the data can be determined and therefore the EOB code is unnecessary.

FIG. 11 is a block diagram showing a moving-picture coding apparatus according to the second embodiment of the present invention. Components identical with those of the first embodiment shown in FIG. 1 are designated by like reference numerals and a detailed description thereof is unnecessary.

In the second embodiment, the apparatus of the first embodiment is further provided with a mean-value calculating circuit 40 and a block-data generating unit 41. In selection processing described below, the processing selecting circuit 27 outputs, on signal line 115, a signal indicating whether mean-value coding processing is to be performed in addition to the coding processing of the first embodiment.

In the second embodiment, the block data that has entered from the input signal line 103 is sent also to the mean-value calculating circuit 40. The latter divides the block data from the signal line 103 into one luminance block and two color-difference blocks, calculates the mean value of each block and delivers the results of calculation to a signal line 210. The results of calculation enter the coder 24 and the block-data generating unit 41.

When processing for mean-value coding, described below, has been selected, the processing selecting circuit 27 transmits a signal, via the signal line 115, indicative of the processing mode. The coder 24 therefore is capable of performing coding processing based upon the mean-value data from the mean-value calculating circuit 210. The block-data generating unit 41 outputs block data reconstructed from the mean value provided by the mean-value calculating circuit 40. The outputted block data is stored in the previous-frame memory 28 again.

In the second embodiment also, the basic construction of the processing selecting circuit 27 is similar to that shown in FIG. 2. However, control for selecting processing in this embodiment is different. The determination method in the selector 1 of the second embodiment will be described with reference to the flowchart of FIG. 12.

Figure 12:
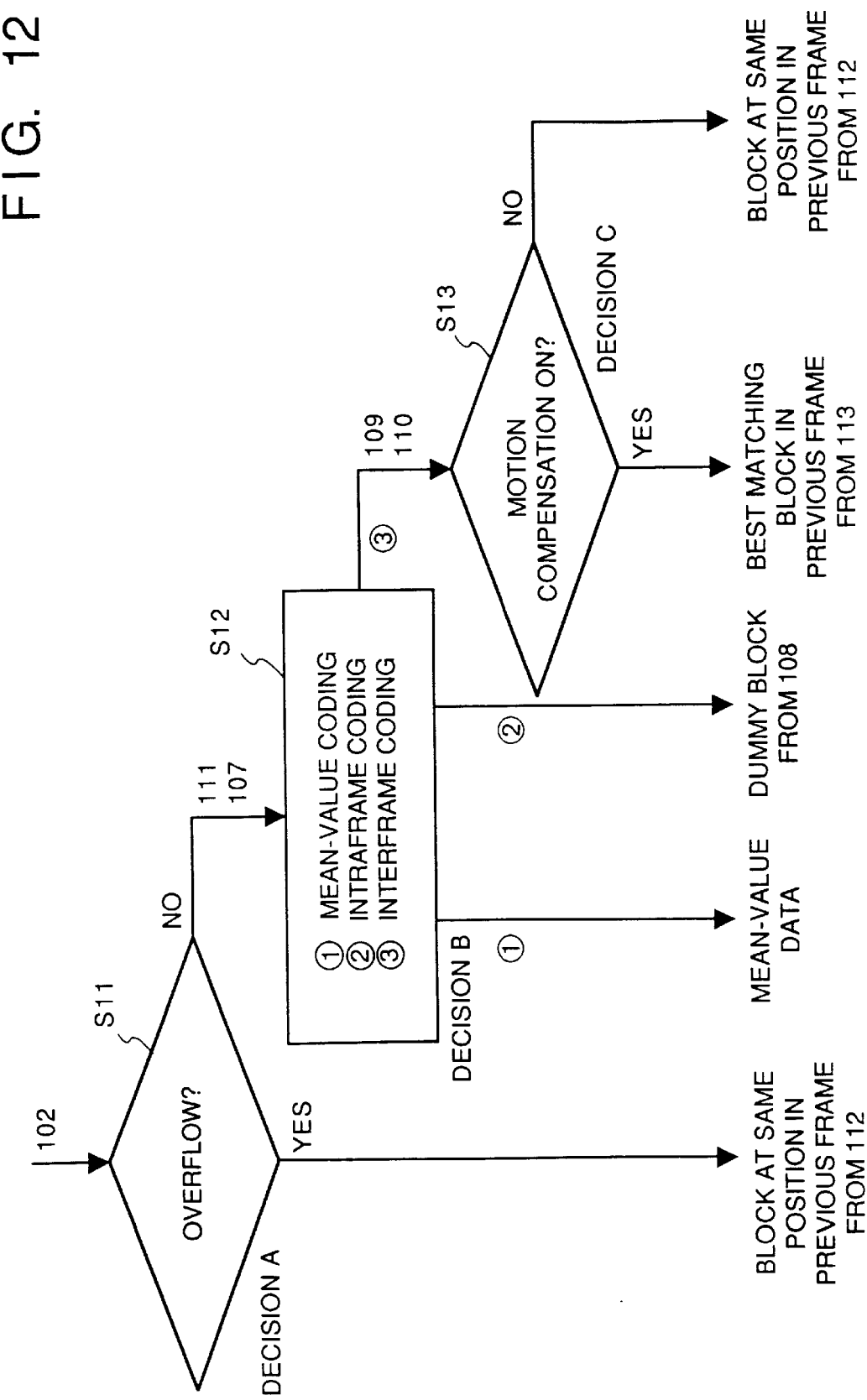
FIG. 12 is a flowchart showing a method of selection processing for selecting a coding method according to the second embodiment.

At step S11, which involves a decision A in FIG. 12, it is determined whether the amount of code generated is large and the overflow state is in effect. If overflow has occurred, block data at the identical position in the previous frame is selected from the signal line 112 in order to select the method of coding interframe difference.

Figure 13:
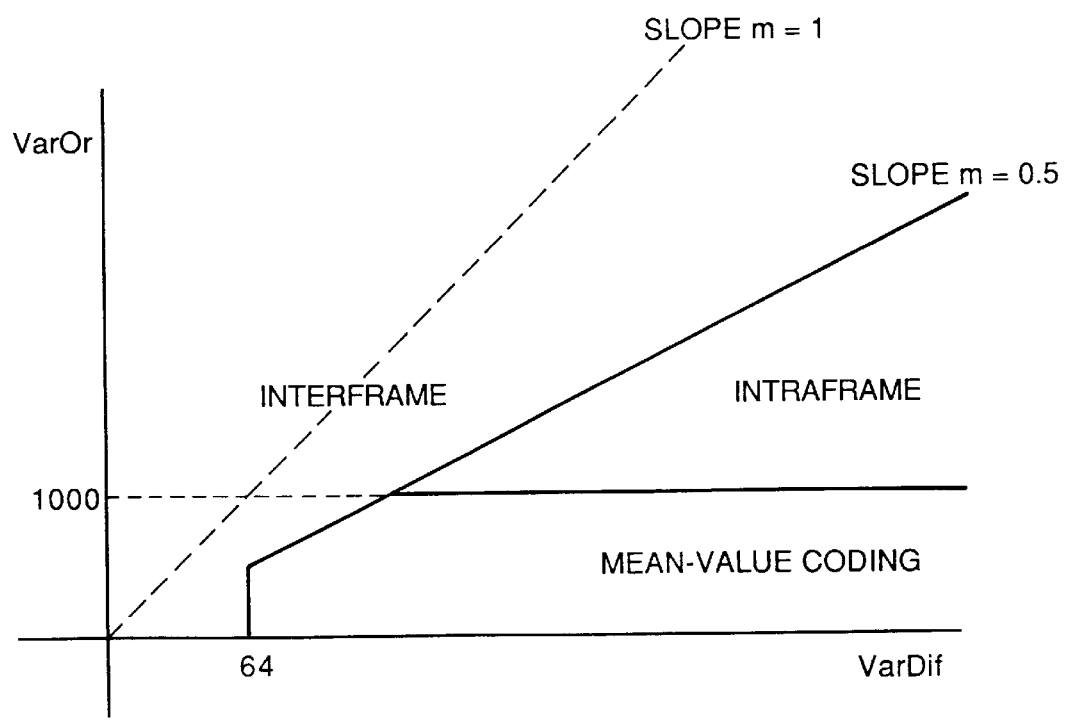
FIG. 13 is a diagram showing a criterion for deciding whether a mean-value coding method and intraframe coding method are to be performed in accordance with the second embodiment.

If overflow has not occurred at step S11, the program proceeds to a decision B at step S12 where it is decided whether to perform the mean-value coding method, the intraframe coding method or the interframe-difference coding method. More specifically, the determination is made based upon the signals VarOr, VarDif on signal lines 107, 111. The determination as to whether the interframe coding method, the intraframe coding method or the mean-value coding method is to be used is made based upon the boundary line in the characteristic shown in FIG. 13.

If intraframe coding is decided at step S12, a dummy block is selected from signal line 108. If meanvalue coding is decided, only the signal indicative of the processing mode is outputted from the signal line 115, as described above. if interframe coding is decided, the program proceeds to step S13.

Figure 14:
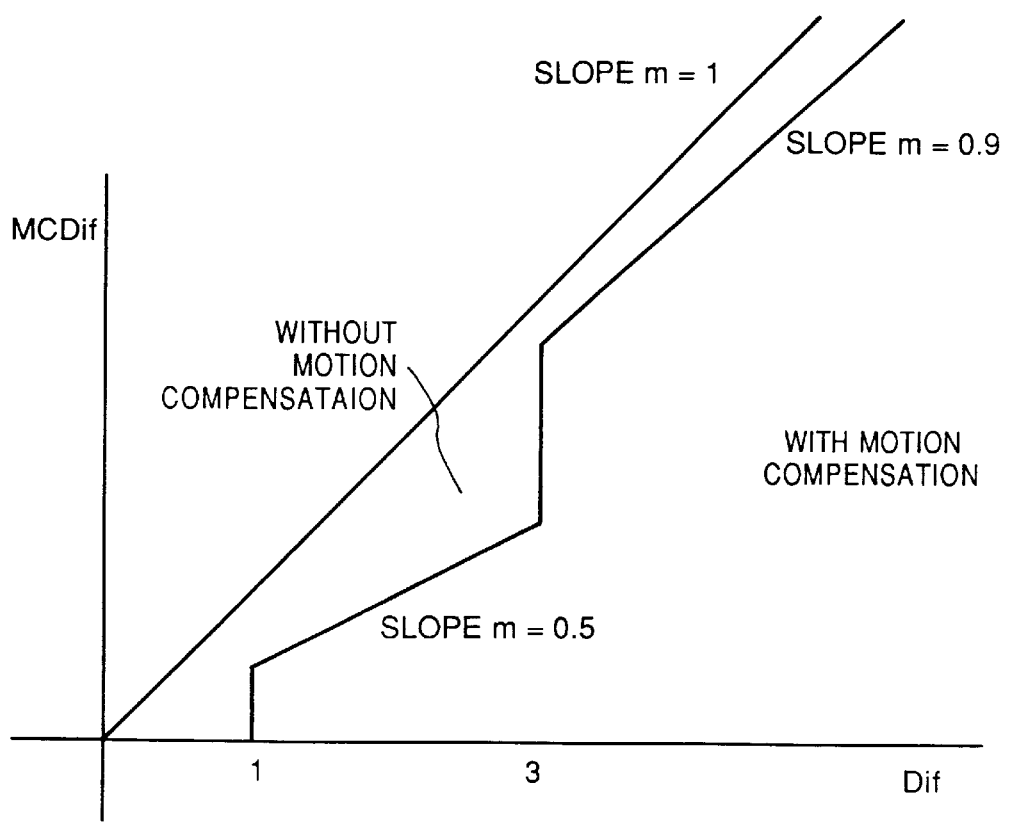
FIG. 14 is a diagram showing a criterion for selectively deciding whether motion compensation is to be applied or not in the method of coding interframe difference according to the second embodiment.

It is determined at step S13, based upon Dif and MCD, whether motion compensation is to be applied. Specifically, in accordance with the boundary line in the characteristic of FIG. 14, the data 113 indicative of the best matching block, which is based upon the method of motion-compensated coding of interframe difference, is selected if motion compensation is decided at step S13.

If no motion compensation is decided, then the interframe coding method is determined without selecting the method of motion-compensated coding of interframe difference. In this case, a block at the identical position in the previous frame from the signal line 112 is selected.

The selected block data is outputted from signal line 114, and the signal indicative of the selected mode is outputted from signal line 115.

It should be noted that if mean-value coding processing is selected as the processing mode, it does not matter what the selector 1 outputs on the signal line 114 because the coder 24 codes the luminance and color-difference data from the mean-value calculating circuit 40.

If the relationship between VarDif and VarOr from the signal lines 111, 107 resides within the region INTRA in accordance with the characteristic shown in FIG. 5, the interframe coding method is used. If the relationship resides in the region INTER, the method of coding interframe difference is selected.

Furthermore, more efficient coding processing can be carried out by providing, in addition to the coding processing based solely upon the orthogonal transformation coding carried out in the prior art, coding processing in which adaptive use is made of coding processing in a frequency space based upon use of orthogonal transformation and coding of intrablock meanvalue data in actual space. For example, more efficient coding processing can be realized by newly providing coding processing in which the mean value of a 16×16 pixel block of luminance data and the mean value of 8×8 pixels of the corresponding two color-difference blocks are subjected to fixed-length coding.

The output code data in accordance with the second embodiment is of the four types shown in FIG. 15 in addition to those shown in FIGS. 10A~10C.

Thus, in the arrangement described above, a highly efficient coding method can be provided in which a method of selecting a processing mode is changed depending upon the size of the quantization step, thereby making appropriate processing selection possible so that the generation and transmission of unnecessary codes can be prevented.

FIG. 21 illustrates a moving-picture coding apparatus which comprises the coders according to both the first and second embodiments.

In FIG. 21, reference numeral 1000 denotes an input unit, e.g., a video camera, for sequentially inputting image information for one frame; 1001, a frame memory for storing the image information from the input unit 1000 in frame units; 1002, a block extracting circuit for extracting block data 103 composed of 8×8 pixel blocks from the image information stored in the frame memory 1001; 1003, a coding unit for coding the block data 103 from the block extracting circuit 1002 into variable-length coded data as shown in FIGS. 1 and 11.

Numeral 1004 denotes a coder which, if the quantization step g is changed, codes the value of the quantization step g and its position. Further, the coder 1004 codes data in accordance with a coding processing selected based on INTRA/MC/INTER region. If the motion-compensated coding of interframe difference is selected, the coder 1004 codes vector data indicating a relative position between the best matching block and the block to be coded. In addition, the coder 1004 codes the other coding parameters. Numeral 1005 denotes a multiplexer for synthesizing the variable-length coded data from the coder 24 with coded data from the coder 1004 and outputting the synthesized data to a controller 1006 sequentially. The controller 1006 counts the data from the multiplexer 1005 as shown in FIG. 20, and controls the coding unit 1003 so as to prevent overflow of a code buffer 1007, which outputs coded data in accordance with transmission speed of a transmission path 1009. The control operations by the controller 1006 are performed using the quantization step g signal 101 and the overflow signal 102. The value of the quantization step g signal 101 becomes larger as the amount of the stored coded data becomes larger. The overflow signal 102 indicates the overflow state if the amount of coded data stored in the code buffer 1007 exceeds a predetermined value. The code buffer 1007 is a buffer for temporarily storing the coded data before a transmission circuit 1008 transmits the coded data. The transmission path 1009 transmits a predetermined amount of coded data per unit time.

It should be noted that the input unit is not limited to a video camera. For example, a device for inputting moving image data formed by a computer software can be employed as the input unit. Further, an orthogonal transformation such as the Hadamard transformation as well as the above-described DCT transformation can be used for coding.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A coding method for coding image data in units of pixel blocks, comprising the steps of:

a decision step of adaptively deciding, based on (i) a correlation between a pixel block of interest and a corresponding block of another frame and (ii) the amount of coded image data, whether the pixel block of interest is to be subjected to processing for intraframe coding or processing for interframe coding; and a coding step of coding the pixel block of interest by using one of the coding processings determined in said decision step.

2. The method according to claim 1, wherein said coding step further performs the coding by using a motion compensation interframe coding method.

3. The method according to claim 1, wherein said coding step further comprises the step of storing coded image data generated in said coding step in a buffer memory.

4. The method according to claim 3, wherein the amount of coded image data is controlled based on a status of the buffer memory.

5. A coding apparatus for coding image data in units of pixel blocks, comprising:

decision means for adaptively deciding, based on (i) a correlation between a pixel block of interest and a corresponding block of another frame and (ii) the amount of coded image data, whether the pixel block of interest is to be subjected to processing for intraframe coding or processing for interframe coding; and coding means for coding the pixel block of interest by using one of the coding processings determined by said decision means.

6. The apparatus according to claim 5, wherein said coding means further performs the coding by using a motion compensation interframe coding method.

7. The apparatus according to claim 5, wherein said coding means further comprises means for storing coded image data generated in said coding means in a buffer memory.

8. The apparatus according to claim 7, wherein the amount of coded image data is controlled based on a status of the buffer memory.

9. A coding apparatus for coding image data in units of pixel blocks, said apparatus comprising:

decision means for adaptively deciding, based on (i) a correlation between a pixel block of interest and a corresponding block of another frame and (ii) the amount of coded image data, whether the pixel block of interest is to be subjected to processing for interpicture motion compensation coding or processing for interpicture coding; and coding means for coding the pixel block of interest by using one of the coding processings determined by said decision means.

10. The apparatus according to claim 9, wherein said coding means further performs the coding by using an intrapicture coding method.

11. The apparatus according to claim 9, wherein said coding means includes quantization means for quantizing the image data in accordance with the amount to coded image data.

12. The apparatus according to claim 11, wherein said coding means includes means for storing coded image data generated in said coding means in a buffer memory.

13. The apparatus according to claim 12, wherein the amount of coded image data is controlled based on a status of the buffer memory.

14. A coding apparatus for coding image data in units of pixel blocks, said apparatus comprising:

decision means for adaptively deciding, based on (i) a correlation between a pixel block of interest and a corresponding block of another frame and (ii) a quantization step, whether the pixel block of interest is to be subjected to processing for intrapicture coding or processing for interpicture coding; and coding means for coding the pixel block of interest by using one of the coding processings determined by said decision means, said coding means including quantization means for quantizing the image data in accordance with the quantization step controlled by the image data.

15. The apparatus according to claim 14, wherein said coding means includes means for storing coded image data generated in said coding means in a buffer memory.

16. The apparatus according to claim 15, wherein the quantization step is controlled based on a status of the buffer memory.

17. A coding apparatus for coding image data in units of pixel blocks, said apparatus comprising:

decision means for adaptively deciding, based on (i) a correlation between a pixel block of interest and a corresponding block of another frame and (ii) a quantization step, whether the pixel block of interest is to be subjected to processing for interpicture coding or processing for interpicture motion compensation coding; and coding means for coding the pixel block of interest by using one of the coding processings determined by said decision means, said coding means including quantization means for quantizing the image data in accordance with a quantization step controlled by the image data.

18. A coding method for coding image data in units of pixel blocks, comprising the steps of:

a decision step for adaptively deciding, based on (i) a correlation between a pixel block of interest and a corresponding block of another frame and (ii) the amount of coded image data, whether the pixel block of interest is to be subjected to processing for interpicture motion compensation coding or processing for interpicture coding; and a coding step for coding the pixel block of interest by using one of the coding processings determined in said decision step.

19. A coding method for coding image data in units of pixel blocks, comprising the steps of:

a decision step of adaptively deciding, based on (i) a correlation between a pixel block of interest and a corresponding block of another frame and (ii) a quantization step, whether the pixel block of interest is to be subjected to processing for intrapicture coding or processing for interpicture coding; and a coding step of coding the pixel block of interest by using one of the coding processings determined in said decision step, said coding step including a quantization step for quantizing the image data in accordance with a quantization parameter controlled by the image data.

20. A coding method for coding image data in units of pixel blocks, comprising the steps of:

a decision step of adaptively deciding, based on (i) a correlation between a pixel block of interest and a corresponding block of another frame and (ii) a quantization step, whether the pixel block of interest is to be subjected to processing for interpicture coding or processing for interpicture motion compensation coding; and a coding step of coding the pixel block of interest by using one of the coding processings determined in said decision step, said coding step including a quantization step for quantizing the image data in accordance with a quantization parameter controlled by the image data.

* * * * *

UNITED STATES PATENT AND TRADEMARK OFFICE
CERTIFICATE OF CORRECTION

PATENT NO.    : 6,049,629
DATED         : April 11, 2000
INVENTOR(S)   : YASUJI HIRABAYASHI It is certified that error appears in the above-identified patent and that said Letters Patent is hereby corrected as shown below:

On the Title Page
Assignee: [73]
  "Canon Kabushiki Kaisha, Japan" should read
-- Canon Kabushiki Kaisha, Tokyo, Japan --.

COLUMN 6
  Line 19, "between" should be deleted.

COLUMN 7
  Line 60, "$MCDif = 1/N^2 \Sigma\Sigma |B_{ij} - PB_{i+m, j+n}|$" should read
-- $MCDif = 1N^2 \Sigma\Sigma |B_{ij} - PB_{i+m, j+n}|$ --.

COLUMN 11
  Line 17, "illustrates" should read -- illustrate --.

COLUMN 14
  Line 33, "meanvalue" should read -- mean-value --.

UNITED STATES PATENT AND TRADEMARK OFFICE
CERTIFICATE OF CORRECTION

PATENT NO.    : 6,049,629
DATED         : April 11, 2000
INVENTOR(S)   : YASUJI HIRABAYASHI It is certified that error appears in the above-identified patent and that said Letters Patent is hereby corrected as shown below:

<u>COLUMN 16</u>
Line 30, "to" should read - - of - -.

Signed and Sealed this

Fifth Day of June, 2001

*Attest:*

*Attesting Officer*

NICHOLAS P. GODICI
*Acting Director of the United States Patent and Trademark Office*